US008884952B2

(12) United States Patent
Kim et al.

(10) Patent No.: US 8,884,952 B2
(45) Date of Patent: *Nov. 11, 2014

(54) 3D DISPLAY APPARATUS AND METHOD FOR PROCESSING IMAGE USING THE SAME

(71) Applicant: Samsung Electronics Co., Ltd., Suwon-si (KR)

(72) Inventors: Sung-jin Kim, Suwon-si (KR); Jong-sul Min, Suwon-si (KR); Jin-sung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,071

(22) Filed: Apr. 3, 2013

(65) Prior Publication Data

US 2013/0257861 A1    Oct. 3, 2013

Related U.S. Application Data

(60) Provisional application No. 61/619,491, filed on Apr. 3, 2012.

(30) Foreign Application Priority Data

Nov. 16, 2012    (KR) .................. 10-2012-0130308

(51) Int. Cl.
*G06F 17/00* (2006.01)
*G06T 1/00* (2006.01)
*G09G 5/00* (2006.01)
*H04N 13/02* (2006.01)
*G06T 15/00* (2011.01)
*H04N 13/04* (2006.01)

(52) U.S. Cl.
CPC ....... *H04N 13/0447* (2013.01); *H04N 13/0282* (2013.01); *G06T 15/00* (2013.10); *H04N 13/011* (2013.01)
USPC ........... 345/419; 345/418; 345/653; 345/664; 345/679

(58) Field of Classification Search
CPC ....... G06T 15/005; G06T 17/20; G06T 17/00; G06T 19/00; G06T 11/001
USPC ................................................. 345/418, 419
See application file for complete search history.

(56) References Cited

U.S. PATENT DOCUMENTS 6,734,854 B1 *    5/2004    Shimizu ...................... 345/422
6,888,540 B2      5/2005    Allen
2003/0012277 A1 *    1/2003    Azuma et al. ............ 375/240.08
(Continued)

OTHER PUBLICATIONS

Office Action, dated for Jul. 9, 2013, issued by the European Patent Office in counterpart European Application No. 13161798.7.

*Primary Examiner* — David Zarka
*Assistant Examiner* — Tapas Mazumder
(74) *Attorney, Agent, or Firm* — Sughrue Mion, PLLC

(57) ABSTRACT

A three-dimensional (3D) display apparatus is provided, including an image input device which receives an image and depth information, a multi-view image generator which generates a multi-view foreground image having depth information which is less than a preset depth value, and a multi-view rear ground image having depth information which is equal to or greater than the preset depth value, using the received image and depth information, a multi-view image renderer which performs rendering by arranging the multi-view foreground image according to a first arrangement pattern and the multi-view rear ground image according to a second arrangement pattern, and a display which outputs the rendered multi-view image.

14 Claims, 12 Drawing Sheets

(56) References Cited

U.S. PATENT DOCUMENTS

| | | |
|---|---|---|
| 2012/0019614 A1 | 1/2012 | Murray et al. |
| 2012/0020548 A1 | 1/2012 | Kao et al. |
| 2012/0038641 A1 | 2/2012 | Levantovsky |
| 2012/0128234 A1* | 5/2012 | Kao et al. .................. 382/154 |

* cited by examiner

3D DISPLAY APPARATUS AND METHOD FOR PROCESSING IMAGE USING THE SAME

CROSS-REFERENCE TO RELATED APPLICATIONS

This application claims priority from U.S. Provisional Patent Application No. 61/619,491, filed on Apr. 3, 2012, in the United States Patent and Trademark Office, and Korean Patent Application No. 10-2012-0130308, filed on Nov. 16, 2012, in the Korean Intellectual Property Office, the disclosures of which are incorporated herein by reference in their entirety.

BACKGROUND

1. Field

Apparatuses and methods consistent with the exemplary embodiments relate to a 3D display apparatus and a method for processing an image using the same, and more particularly, to a 3D display apparatus which reduces a dead zone which may be generated according to a viewing position of the viewer, and a method for processing an image using the same.

2. Description of the Related Art

Recently, an effort to develop a three-dimensional (3D) display apparatus has been accelerated for viewing with cubic effect. Accordingly, 3D images which were able to be watched mainly in the theater can be watched at home using a general display apparatus such as a television.

3D display apparatuses may be divided into a glass type system and a glasses-free system according to whether glasses are used for watching a 3D image.

An example of a glass type system is a shutter glass display apparatus. In the shutter glass scheme, left-eye and right-eye images are output alternately and left and right shutter glasses of 3D glasses worn by the viewer are opened or closed alternately in conjunction with the output of left-eye and right-eye images so that the viewer can feel a cubic effect.

A glasses-free system is also referred to as an autostereoscopic system. A glasses-free 3D display apparatus displays optically separated multi-view images and transmits light corresponding to images of different views to the viewer's left and right eyes using parallax barriers or lenticular lenses so that the viewer can feel a cubic effect.

FIG. 1 illustrates the display of multi-view images of a general glasses-free 3D display apparatus.

With reference to FIG. 1, multi-view images are reproduced by rendering optically separated multi-view images from the $1^{st}$ view to the $9^{th}$ view in a way that the $1^{st}$ view image is positioned in the $1^{st}$ view position and the $9^{th}$ view image is positioned in the $9^{th}$ view position. If the viewer is positioned between the $1^{st}$ view and the $9^{th}$ view, the viewer can watch a 3D image without the need of glasses and feel motion parallax according to the change of a viewing position. However, a general 3D display apparatus arranges and displays images sequentially from the $1^{st}$ view to the $9^{th}$ view so that a dead zone may be generated according to the viewing position.

A dead zone indicates a position where a viewing position of the viewer changes from the $N^{th}$ view to the $1^{st}$ view. In the dead zone, the viewer watches at the same time images of two views which are separated far away so that serious crosstalk may occur. Consequently, the viewer cannot watch the 3D image. As shown in FIG. 1, the position where the $9^{th}$ view image and the $1^{st}$ view image are viewed at the same time is a dead zone.

FIG. 2 illustrates an arrangement pattern of multi-view images of a general glasses-free 3D display apparatus.

With reference to FIG. 2, multi-view images are arranged sequentially according to each optical view as illustrated in FIG. 1. Accordingly, a radical difference of image views, i.e. a dead zone, occurs in positions of the $9^{th}$ view and the $1^{st}$ view.

In the dead zone, a 3D image cannot be viewed normally due to crosstalk.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

The exemplary embodiments provide a 3D display apparatus and an image processing method thereof, which allow the viewer to watch a 3D image comfortably at any position using a multi-view image processing method to reduce dead zones.

According to an aspect of an exemplary embodiment, a three-dimensional (3D) display apparatus includes an image input device which receives an image and depth information, a multi-view image generator which generates a multi-view foreground image having depth information which is less than a preset depth value, and a multi-view rear ground image having depth information which is equal to or higher than the preset depth value, using the received image and depth information, a multi-view image renderer which performs rendering by arranging the multi-view foreground image according to a first arrangement pattern and the multi-view rear ground image according to a second arrangement pattern, and a display which outputs the rendered multi-view image.

The multi-view foreground image and the multi-view rear ground image each may have "N" views, if "N" is an odd number (2K−1, K is a natural number), the first arrangement pattern may be a repeat of a pattern where $1^{st}$ view to $K^{th}$ view are arranged sequentially and then K−$1^{th}$ view to $1^{st}$ view are arranged in reverse order, or if "N" is an even number (2K, K is a natural number), the first arrangement pattern may be a repeat of a pattern where $1^{st}$ view to K+$1^{th}$ view are arranged sequentially and then $K^{th}$ view to $2^{nd}$ view are arranged in reverse order, and the second arrangement pattern may be a pattern obtained by shifting the first arrangement pattern by a predetermined number of views and thereby having a phase difference.

The multi-view foreground image and the multi-view rear ground image each may have 9 views, the first arrangement pattern may be a pattern where $1^{st}$, $2^{nd}$, $3^{rd}$, $4^{th}$, $5^{th}$, $4^{th}$, $3^{rd}$, $2^{nd}$, and $1^{st}$ view foreground images are arranged repeatedly, and the second arrangement pattern may be a pattern where $2^{nd}$, $3^{rd}$, $4^{th}$, $5^{th}$, $4^{th}$, $3^{rd}$, $2^{nd}$, $1^{st}$, and $2^{nd}$ view rear ground images is arranged repeatedly.

The multi-view foreground image and the multi-view rear ground image each may have "N" views, the first arrangement pattern may be a repeat of a pattern where odd views of $1^{st}$ to $N^{th}$ views are arranged sequentially and then even views of $N^{th}$ to $1^{st}$ views are arranged in reverse order, and the second arrangement pattern may be a pattern obtained by shifting the first arrangement pattern by a predetermined number of views and thereby having a phase difference.

The multi-view foreground image and the multi-view rear ground image each may have 9 views, the first arrangement pattern may be a pattern where $1^{st}, 3^{rd}, 5^{th}, 7^{th}, 9^{th}, 8^{th}, 6^{th}, 4^{th}$, and $2^{nd}$ view foreground images are arranged repeatedly, and the second arrangement pattern may be a pattern where $3^{rd}, 5^{th}, 7^{th}, 9^{th}, 8^{th}, 6^{th}, 4^{th}, 2^{nd}$, and $1^{st}$ view foreground images are arranged repeatedly.

The multi-view foreground image and the multi-view rear ground image each may have "N" views, the first arrangement pattern may be a repeat of a pattern where odd views of $1^{st}$ to $N^{th}$ views are arranged sequentially and then even views of $N^{th}$ to $1^{st}$ views are arranged in reverse order, and if N is an odd number, the second arrangement pattern may be a repeat of a pattern where $1^{st}$ view is arranged first, even views of $2^{nd}$ to $N^{th}$ views are arranged sequentially and then odd views of $N^{th}$ to $2^{nd}$ views are arranged in reverse order, or if N is an even number, the second arrangement pattern may be a repeat of a pattern where even views of $1^{st}$ to $N^{th}$ views are arranged sequentially and then odd views of $N^{th}$ to $1^{st}$ views are arranged in reverse order.

The multi-view foreground image and the multi-view rear ground image each may have 9 views, the first arrangement pattern may be a pattern where $1^{st}, 3^{rd}, 5^{th}, 7^{th}, 9^{th}, 8^{th}, 6^{th}, 4^{th}$, and $2^{nd}$ view foreground images are arranged repeatedly, and the second arrangement pattern may be a pattern where $1^{st}, 2^{nd}, 4^{th}, 6^{th}, 8^{th}, 9^{th}, 7^{th}, 5^{th}$, and $3^{rd}$ view rear ground images are arranged repeatedly.

According to another aspect of an exemplary embodiment, an image processing method of a 3D display apparatus is provided, the method including receiving an image and depth information of the image, generating a multi-view foreground image having depth information which is less than a preset depth value, and a multi-view rear ground image having depth information which is equal to or higher than the preset depth value, based on the received image and depth information, performing rendering by arranging the multi-view foreground image according to a first arrangement pattern and the multi-view rear ground image according to a second arrangement pattern, and outputting the rendered multi-view image.

The multi-view foreground image and the multi-view rear ground image each may have "N" views. If "N" is an odd number (2K−1, K is a natural number), the first arrangement pattern may be a repeat of a pattern where $1^{st}$ view to $K^{th}$ view are arranged sequentially and then K−$1^{th}$ view to $1^{st}$ view are arranged in reverse order, or if "N" is an even number (2K, K is a natural number), the first arrangement pattern may be a repeat of a pattern where $1^{st}$ view to K+$1^{th}$ view are arranged sequentially and then $K^{th}$ view to $2^{nd}$ view are arranged in reverse order. The second arrangement pattern may be a pattern obtained by shifting the first arrangement pattern by a predetermined number of views and thereby having a phase difference.

The multi-view foreground image and the multi-view rear ground image each may have "N" views. The first arrangement pattern may be a repeat of a pattern where odd views of $1^{st}$ to $N^{th}$ views are arranged sequentially and then even views of $N^{th}$ to $1^{st}$ views are arranged in reverse order, and the second arrangement pattern may be a pattern obtained by shifting the first arrangement pattern by a predetermined number of views and thereby having a phase difference.

The multi-view foreground image and the multi-view rear ground image each may have "N" views. The first arrangement pattern may be a repeat of a pattern where odd views of $1^{st}$ to $N^{th}$ views are arranged sequentially and then even views of $N^{th}$ to $1^{st}$ views are arranged in reverse order. If N is an odd number, the second arrangement pattern may be a repeat of a pattern where the $1^{st}$ view is arranged first, even views of $2^{nd}$ to $N^{th}$ views are arranged sequentially and then odd views of the $N^{th}$ to $2^{nd}$ views are arranged in reverse order. If N is an even number, the second arrangement pattern may be a repeat of a pattern where even views of $1^{st}$ to $N^{th}$ views are arranged sequentially and then odd views of $N^{th}$ to $1^{st}$ views are arranged in reverse order.

According to another aspect of an exemplary embodiment, a non-transitory computer readable medium which includes a program to execute an image processing method of a 3D display apparatus is provided wherein the image processing method includes receiving an image and depth information of the image, generating a multi-view foreground image having depth information which is less than a preset depth value, and a multi-view rear ground image having depth information which is equal to or higher than the preset depth value, based on the received image and the received depth information of the image, performing rendering by arranging the multi-view foreground image according to a first arrangement pattern and the multi-view rear ground image according to a second arrangement pattern, and outputting the rendered multi-view image.

Additional and/or other aspects of the exemplary embodiment will be set forth in part in the description which follows and, in part, will be obvious from the description, or may be learned by practice of the exemplary embodiments.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Figure 1:
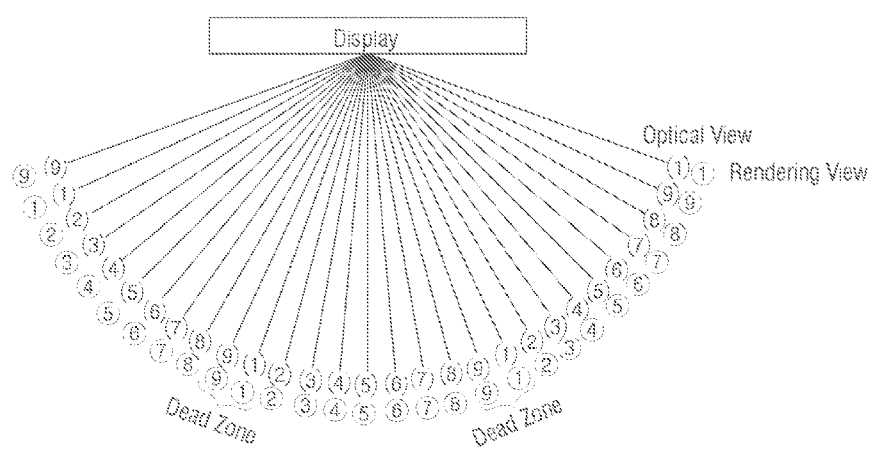
FIG. 1 illustrates display of multi-view images of a general glasses-free 3D display apparatus.
Figure 2:
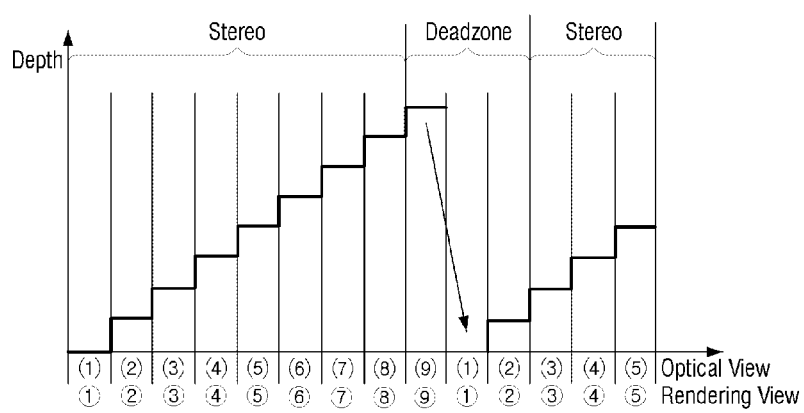
FIG. 2 illustrates rendering of multi-view images of a general glasses-free 3D display apparatus.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 3:
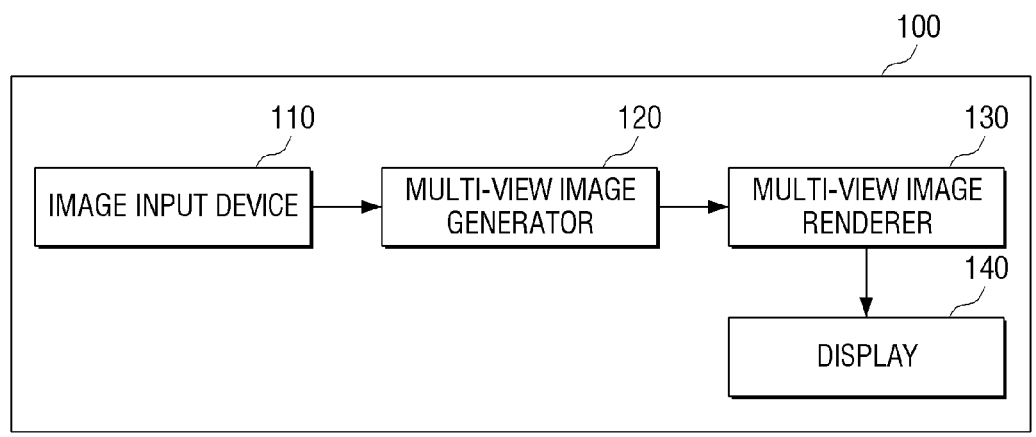
FIG. 3 is a block diagram illustrating a configuration of a 3D display apparatus according to an exemplary embodiment.

FIG. 3 is a block diagram illustrating a configuration of a three-dimensional (3D) display apparatus according to an exemplary embodiment. A 3D display apparatus is an apparatus which displays content in a 3D manner, thereby allowing the viewer to feel a cubic effect. Diverse devices such as televisions (TVs), monitors, personal computers (PCs), mobile phones, laptop computers, tablet PCs, electronic picture frames, electronic books and personal digital assistants (PDAs) may be implemented with 3D display apparatuses. A 3D display apparatus according to the present exemplary embodiment may be implemented in a glasses-free 3D display scheme.

With reference to FIG. 3, the 3D display apparatus 100 may include an image input device 110, a multi-view image generator 120, a multi-view image renderer 130, and a display 140.

The image input device 110 receives an image and depth information of the image. More specifically, the image input device 110 may receive an image and depth information of the image from diverse external devices such as an external storage medium, a broadcasting station, a web server and the like.

The input image may be one of a single-view image, a stereoscopic image, and a multi-view image. The single-view image is an image photographed by a general photographing device. The stereoscopic image is a 3D video image expressed only in a left and right image, which are cubic images taken by a stereoscopic photographing device. In general, a stereoscopic photographing device is a photographing device having two lenses, which are used to photograph a cubic image. The multi-view image is a 3D video image which provides the viewer with diverse views from multiple directions by geometrically correcting images taken by one or more photographing devices and spatially composing the images.

The image input device 110 receives depth information of an image.

The depth information is a value of depth given to each pixel of the image. For example, depth information of 8 bits may have values ranging from 0 to 255. In general, depth information may be obtained in a passive way by using the 2-dimensional feature of an image such as stereo matching or in an active way by using equipment such as a depth camera. Depth information may be a depth map.

In general, as the distance of an image gets closer, a depth value gets smaller, and as the distance of the image gets further away from the viewer, a depth value gets larger, or vice versa. However, for the sake of convenience, the exemplary embodiments will describe the example when a distance of an image gets closer, a depth value gets smaller.

The multi-view image generator 120 generates, based on the input image and depth information of the image, a multi-view foreground image having depth information smaller than a preset depth value, and a multi-view rear ground image having depth information equal to or larger than a preset depth value. More specifically, the multi-view image generator 120 separates a foreground image and a rear ground image using the input depth information, and generates a multi-view foreground image and a multi-view rear ground image by processing the foreground image and the rear ground image appropriately according to the type of image.

The foreground image and the rear ground image may be separated using the depth information. A method for separating the foreground image and the rear ground image is described below.

In this exemplary embodiment, depth information of 8 bits is used. Each pixel may have a depth value ranging from 0 to 255. In this case, a reference depth value for separating the foreground and rear ground may be set to 128. If depth information of a pixel is less than 128, the pixel belongs to a foreground image, and if depth information of a pixel is equal to or greater than 128, the pixel belongs to a rear ground image. That is, the foreground image is a set of pixels having depth information which is less than 128, and the rear ground image is a set of pixels having depth information which is equal to or greater than 128.

A preset depth value may be 128 which is the median value of depth values obtained by the depth information. A preset depth value for separating a foreground image and a rear ground image is generally set to the median value, but it may be modified.

A method for separating a foreground image and a rear ground image will be described below in greater detail with reference to FIG. 4. A method for generating a multi-view foreground image and a multi-view rear ground image using the separated foreground image and rear ground image is described below.

In the 3D display apparatus 100 according to the present exemplary embodiment, if "n" view images are given corresponding to "n" views, generating multi-view images is not needed. However, in order to photograph "n" view images, the "n" view images should be photographed by "N" photographing devices at the same time, and it is actually difficult to receive data of a high capacity.

Accordingly, "n" virtual view images are generated using a single-view image or view images under "N".

Virtual multi-view images are generated using depth information of each view and images of adjacent views.

For example, if 2 views of the images are used, a plurality of new views are made between the 2 views of the images. Subsequently, the $1^{st}$ view image and the $2^{nd}$ view image are sent to 3D space using the input depth information, and a desired view is made.

Such an image processing technology is referred to as 3D warping. In general, a multi-view image which is generated using 2 view images rather than a single view image has less distortion.

In this manner, the multi-view image generator 120 may generate a multi-view foreground image and a multi-view rear ground image using the input image and depth information of the image.

The multi-view image renderer 130 performs rendering by arranging the multi-view foreground image according to the first arrangement pattern and by arranging the multi-view rear ground image according to the second arrangement pattern. The second arrangement pattern may be the same as the first one according to an exemplary embodiment.

Arrangement patterns to reduce dead zones are described according to each exemplary embodiment.

The first and second arrangement pattern according to the first exemplary embodiment is described here.

If there are "N" multi-view foreground images and "N" multi-view rear ground images, examples of the first arrangement pattern and second arrangement pattern according to the first exemplary embodiment may differ according to whether "N" is an odd number or even number, and thus are described separately.

If "N" is an odd number (2K−1, K is a natural number), the first arrangement pattern may be a repeat of a pattern where the $1^{st}$ view to $K^{th}$ view are arranged sequentially and then the K−$1^{th}$ view to $1^{st}$ view are arranged in reverse order. The second arrangement pattern may be a pattern obtained by shifting the first arrangement pattern by a predetermined number of views and thereby having a phase difference.

For example, if there are a total of 9 views, the first arrangement pattern according to the first exemplary embodiment is a pattern where the $1^{st}$, $2^{nd}$, $3^{rd}$, $4^{th}$, $5^{th}$, $4^{th}$, $3^{rd}$, $2^{nd}$, and $1^{st}$ view foreground images are arranged repeatedly, and the second arrangement pattern is a pattern where $2^{nd}$, $3^{nd}$, $4^{th}$, $5^{th}$, $4^{th}$, $3^{rd}$, $2^{nd}$, $1^{st}$, and $2^{nd}$ view rear ground images are arranged repeatedly.

On the other hand, if "N" is an even number (2K, K is a natural number), the first arrangement pattern may be a repeat of a pattern where the $1^{st}$ view to $K+1^{th}$ view are arranged sequentially and then the $K^{th}$ view to $2^{nd}$ view are arranged in reverse order. The second arrangement pattern may be a pattern obtained by shifting the first arrangement pattern by a predetermined number of views and thereby having a phase difference.

For example, if there are a total of 8 views, the first arrangement pattern according to the first exemplary embodiment is a pattern where the $1^{st}$, $2^{nd}$, $3^{rd}$, $4^{th}$, 5, $4^{th}$, $3^{rd}$ and $2^{nd}$ view foreground images are arranged repeatedly, and the second arrangement pattern is a pattern where $2^{nd}$, $3^{rd}$, $4^{th}$, $5^{th}$, $4^{th}$, $3^{rd}$, $2^{nd}$, and $1^{st}$ view foreground images are arranged repeatedly.

The arrangement patterns according to the first exemplary embodiment will be described below with reference to FIGS. 5 and 6.

The first and second arrangement pattern according to the second exemplary embodiment is described here.

In the second exemplary embodiment, there are "N" multi-view foreground images and "N" multi-view rear ground images, as in the first exemplary embodiment. However, unlike the first exemplary embodiment, examples of the first arrangement pattern and second arrangement pattern according to the second exemplary embodiment are the same regardless of whether "N" is an odd number or even number, and thus are not separately described.

The first arrangement pattern according to the second exemplary embodiment may be a repeat of a pattern where the odd views of the $1^{st}$ to $N^{th}$ views are arranged sequentially and then the even views of the $N^{th}$ to $1^{st}$ views are arranged in reverse order. The second arrangement pattern may be a pattern obtained by shifting the first arrangement pattern by a predetermined number of views and thereby having a phase difference.

For example, if there are a total of 9 views, the first arrangement pattern according to the second exemplary embodiment is a pattern where the $1^{st}$, $3^{rd}$, $5^{th}$, $7^{th}$, $9^{th}$, $8^{th}$, $6^{th}$, $4^{th}$, and $2^{nd}$ view foreground images are arranged repeatedly, and the second arrangement pattern is a pattern where the $3^{rd}$, $5^{th}$, $7^{th}$, $9^{th}$, $8^{th}$, $6^{th}$, $4^{th}$, $2^{nd}$, and $1^{st}$ view rear ground images are arranged repeatedly.

On the other hand, if there are a total of 8 views, the first arrangement pattern according to the second exemplary embodiment is a pattern where the $1^{st}$, $3^{rd}$, $5^{th}$, $7^{th}$, $8^{th}$, $6^{th}$, $4^{th}$, and $2^{nd}$ view foreground images are arranged repeatedly, and the second arrangement pattern is a pattern where the $3^{rd}$, $5^{th}$, $7^{th}$, $8^{th}$, $6^{th}$, $4^{th}$, $2^{nd}$, and $1^{st}$ view rear ground images are arranged repeatedly.

The arrangement patterns according to the second exemplary embodiment will be described below with reference to FIGS. 5 and 6.

The first and second arrangement pattern according to the third exemplary embodiment is described here.

In the third exemplary embodiment, there are "N" multi-view foreground images and "N" multi-view rear ground images, as in the first and second exemplary embodiments. However, unlike the first and second exemplary embodiments, the first arrangement pattern and second arrangement pattern according to the third exemplary embodiment are differently designed.

The first arrangement pattern according to the third exemplary embodiment may be a repeat of a pattern where the odd views of the $1^{st}$ to $N^{th}$ views are arranged sequentially and then the even views of the $N^{th}$ to $1^{st}$ views are arranged in reverse order. If N is an odd number, the second arrangement pattern may be a repeat of a pattern where the $1^{st}$ view is arranged first, the even views of the $2^{nd}$ to $N^{th}$ views are arranged sequentially and then the odd views of the $N^{th}$ to $2^{nd}$ views are arranged in reverse order. If N is an even number, the second arrangement pattern may be a repeat of a pattern where the even views of the $1^{st}$ to $N^{th}$ views are arranged sequentially and then the odd views of the $N^{th}$ to $1^{st}$ views are arranged in reverse order.

For example, if there are a total of 9 views, the first arrangement pattern according to the third exemplary embodiment is a pattern where the $1^{st}$, $3^{rd}$, $5^{th}$, $7^{th}$, $9^{th}$, $8^{th}$, $6^{th}$, $4^{th}$, and $2^{nd}$ view foreground images are arranged repeatedly, and the second arrangement pattern is a pattern where the $1^{st}$, $2^{nd}$, $4^{th}$, $6^{th}$, $8^{th}$, $9^{th}$, $7^{th}$, $5^{th}$, and $3^{rd}$ view rear ground images are arranged repeatedly.

On the other hand, if there are a total of 8 views, the first arrangement pattern according to the third exemplary embodiment is a pattern where the $1^{st}$, $3^{rd}$, 5, $7^{th}$, $8^{th}$, $6^{th}$, $4^{th}$, and $2^{nd}$ view foreground images are arranged repeatedly, and the second arrangement pattern is a pattern where the $2^{nd}$, $4^{th}$, $6^{th}$, $8^{th}$, $7^{th}$, $5^{th}$, $3^{rd}$, and $1^{st}$ view rear ground images are arranged repeatedly.

The arrangement patterns according to the third exemplary embodiment will be described below with reference to FIGS. 9 and 10.

The multi-view foreground images and rear ground images are designed with the arrangement patterns as described above. Accordingly, wherever the viewer is positioned, a sudden change of image view may not occur. Consequently, dead zones are not generated.

In addition, even when multi-view images where foreground images and rear ground images are not separated are arranged and rendered as in the first arrangement patterns of the first, second and third exemplary embodiments, a sudden change of image view may be reduced, thereby obtaining the effect as described above.

However, in multi-view images where foreground images and rear ground images are not separated, a stereo section where views are sequentially arranged and a pseudo stereo section where views are arranged in reverse order occur. Accordingly, impact may occur by switching between a stereo section and a pseudo stereo section according to a position of the viewer.

Therefore, the present exemplary embodiment uses a pattern where a multi-view foreground image and a multi-view rear ground image are arranged with a predetermined phase difference so that the impact generated by switching between a stereo section and a pseudo stereo section may be relieved. Further, a pseudo stereo section which makes the viewing of the image by the viewer uncomfortable, may be reduced.

The display 140 outputs a rendered multi-view image. More specifically, the display 140 optically separates a multi-view image rendered by the multi-view image renderer 130 and displays the separated multi-view image. Methods for optically separating a multi-view image may use parallax barriers or lenticular lenses. The multi-view image separated by the methods above is repeatedly separated and displayed in front of the 3D display apparatus 100 so that the viewer can watch a 3D image by binocular disparity.

In view of the above, the 3D display apparatus 100 enables the viewer to watch a 3D image conveniently at any position using a multi-view image processing method in order to reduce dead zones.

Figure 4:
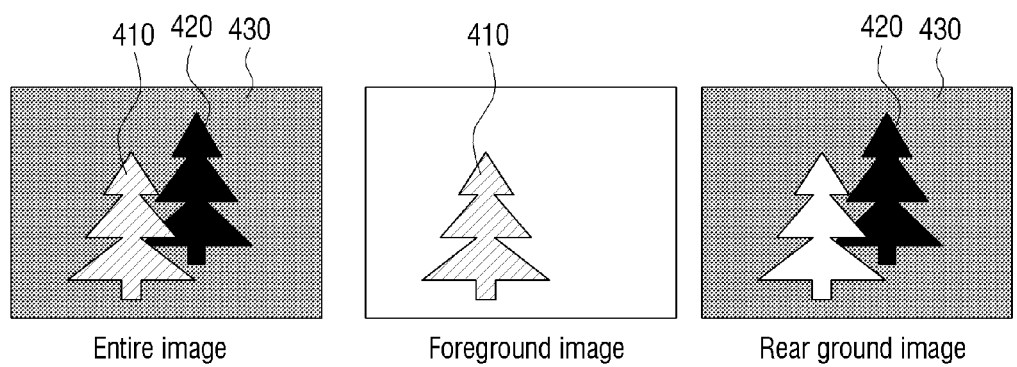
FIG. 4 illustrates operation of a multi-view image generator according to an exemplary embodiment.

FIG. 4 illustrates an operation of the multi-view image generator 120 according to an exemplary embodiment. More specifically, FIG. 4 illustrates an operation of separating an image input by the image input device 110 into a foreground image and a rear ground image using depth information.

The entire image includes a foreground image and a rear ground image. As described with reference to FIG. 1, a foreground image is a set of pixels having depth information which is less than a preset depth value, and a rear ground image is a set of pixels having depth information which is equal to or greater than the preset depth value.

For convenience of description, in the exemplary embodiment depth information is 8 bits and each pixel has a depth value ranging from 0 to 255.

In the exemplary embodiment illustrated in FIG. 4, depth information of pixel values indicating a shaded tree 410 is 70, depth information of pixel values indicating a black tree 420 is 150, and depth information of pixel values indicating a background 430 is 255. On the basis of the setting of a reference depth value for separating the foreground and rear ground at 125, the shaded tree 410 having a depth value under 125 is referred to as a foreground image, and the black tree 420 and background 430 having a depth value over 125 are referred to as a rear ground image. As described with reference to FIG. 4, the multi-view image generator 120 separates a foreground image and a rear ground image using the preset reference value.

Patterns for arranging multi-view images using the multi-view image renderer 130 are described with reference to FIGS. 5 to 10. Here, a multi-view foreground image and a multi-view rear ground image each have 9 views, but it may also be possible that a multi-view foreground image and a multi-view rear ground image each have any number of other multi-views, such as 8 views.

Figure 5:
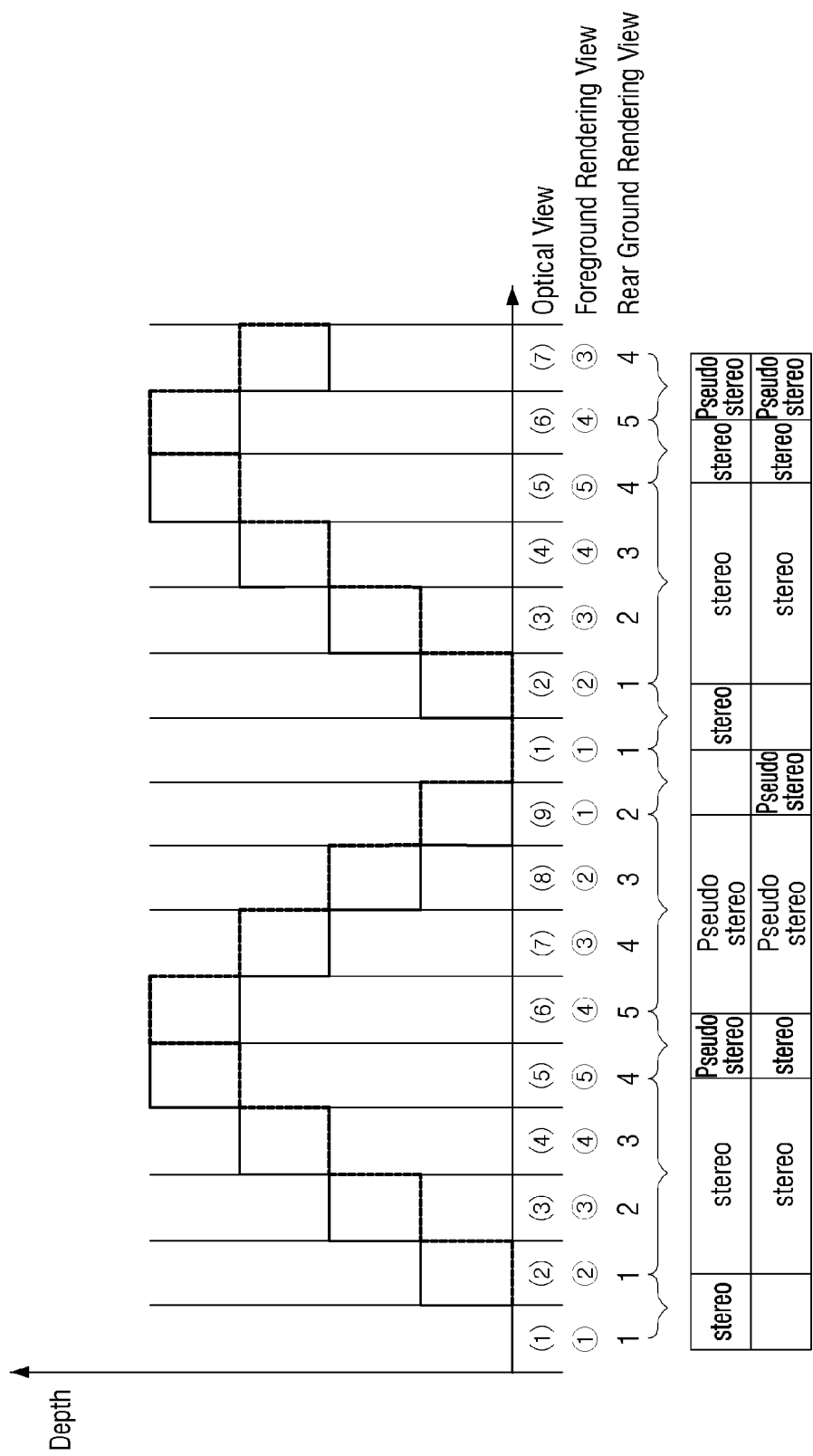
FIGS. 5 and 6 illustrate an arrangement pattern of multi-view images according to the first exemplary embodiment.
Figure 6:
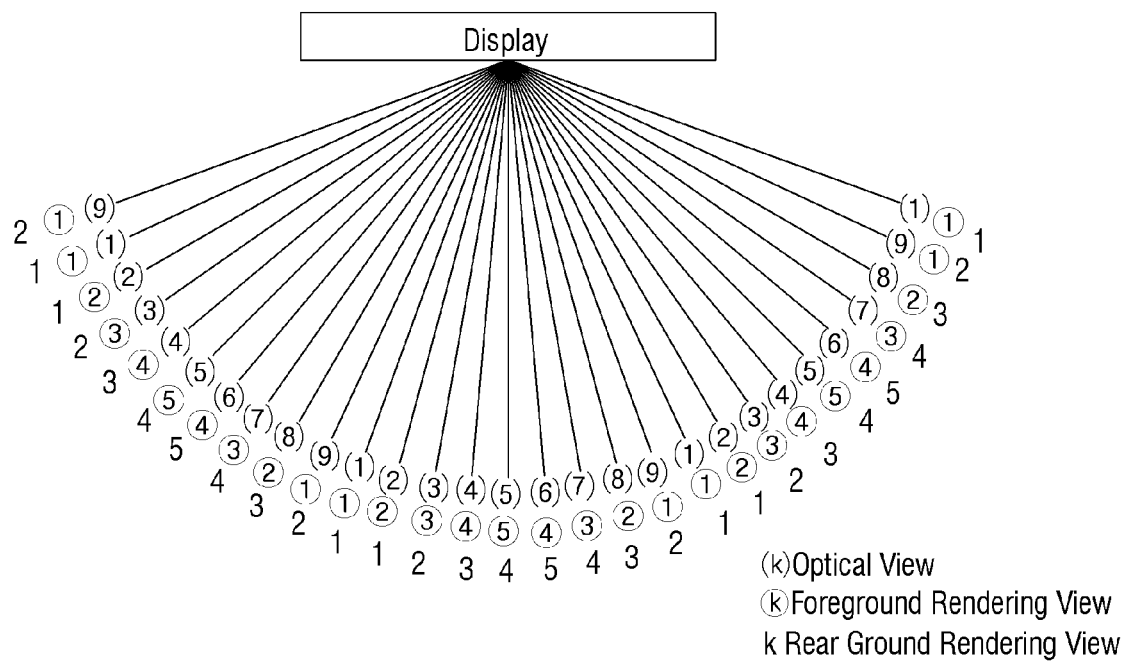

FIGS. 5 and 6 illustrate an arrangement pattern of multi-view images according to the first exemplary embodiment.

The first arrangement pattern according to the first exemplary embodiment, i.e. an arrangement pattern of multi-view foreground images is a repeat of a pattern where the $1^{st}$ view to $K^{th}$ view are arranged sequentially and then the $K-1^{th}$ view to $1^{st}$ view are arranged in reverse order. The second arrangement pattern, i.e. an arrangement pattern of multi-view rear ground images is a pattern obtained by shifting the first arrangement pattern by a predetermined number of views and thereby having a phase difference. The predetermined number of views are preferably 1 view, but may be modified according to the setting of the user.

With reference to FIG. 5, multi-view foreground images and multi-view rear ground images may be arranged as in Table 1 below, according to an optical view.

TABLE 1

| Optical view | 1 | 2 | 3 | 4 | 5 | 6 | 7 | 8 | 9 | 1 | 2 | 3 |
|---|---|---|---|---|---|---|---|---|---|---|---|---|
| Foreground image view | 1 | 2 | 3 | 4 | 5 | 4 | 3 | 2 | 1 | 1 | 2 | 3 |
| Rear ground image view | 1 | 1 | 2 | 3 | 4 | 5 | 4 | 3 | 2 | 1 | 1 | 2 |

As illustrated in FIG. 5, at the $5^{th}$ and $6^{th}$ optical views, the foreground image views are pseudo stereo, and the rear ground image views are stereo. The foreground image views switch from stereo to pseudo stereo at the $5^{th}$ and $6^{th}$ optical views, and the rear ground image views switch from stereo to pseudo stereo at the $6^{th}$ and $7^{th}$ optical views. Since the foreground image views switch from stereo to pseudo stereo first and then the rear ground image views switch from stereo to pseudo stereo, impact generated by switching from stereo to pseudo stereo may be relieved. In addition, the pseudo stereo section is less than in a multi-view image in which a foreground and a rear ground are not separated so that a pseudo stereo section which makes the viewing of the image by the viewer awkward, may be reduced.

FIG. 6 illustrates operation of the 3D display apparatus 100 which optically separates and displays multi-view images rendered according to the first exemplary embodiment. In FIG. 6, views of the foreground images and rear ground images arranged according to the first exemplary embodiment are illustrated corresponding to each optical view. For example, if the viewer is positioned at the $5^{th}$ and $6^{th}$ optical views, the left eye of the viewer may watch the $5^{th}$ view foreground image and the $4^{th}$ view rear ground image, and the right eye may watch the $4^{th}$ view foreground image and the $5^{th}$ view rear ground image.

Figure 7:
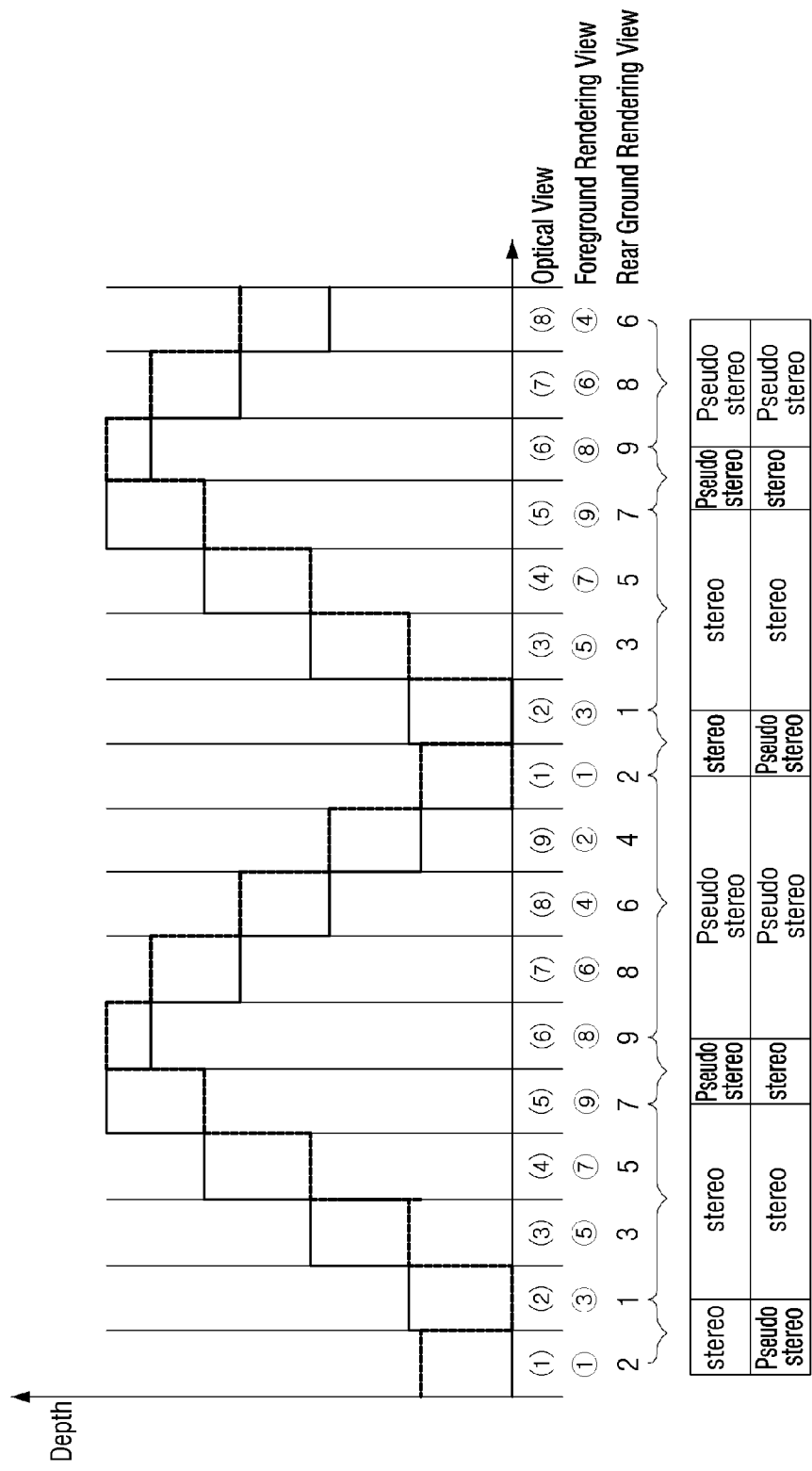
FIGS. 7 and 8 illustrate an arrangement pattern of multi-view images according to the second exemplary embodiment.
Figure 8:
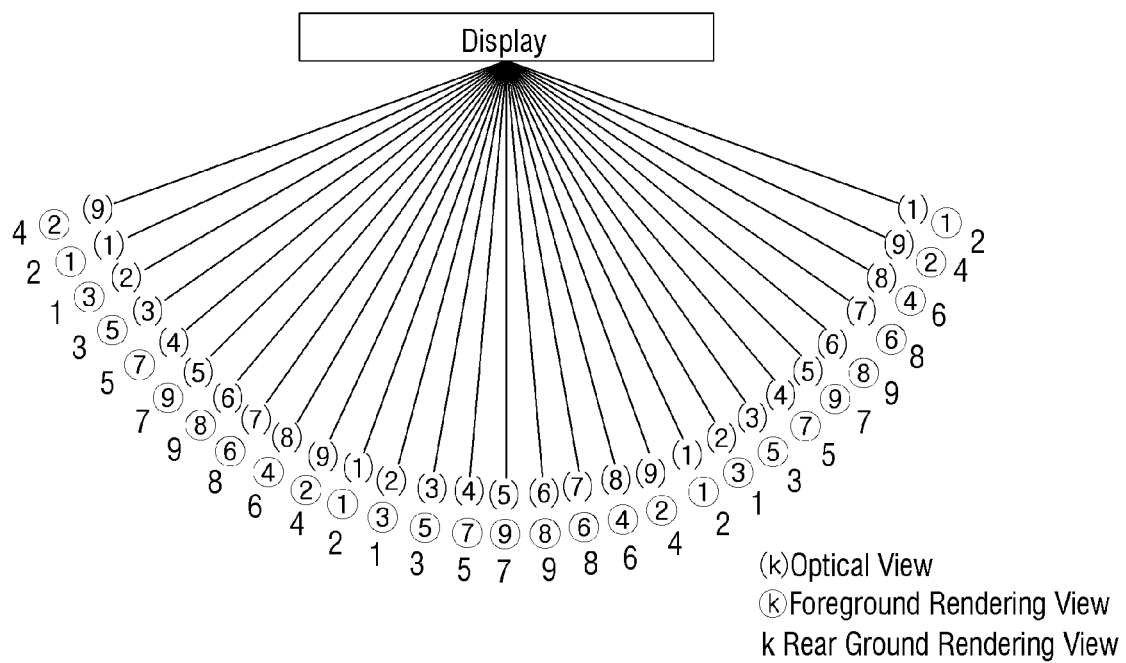

FIGS. 7 and 8 illustrate an arrangement pattern of multi-view images according to the second exemplary embodiment.

The first arrangement pattern according to the second exemplary embodiment, i.e. an arrangement pattern of multi-view foreground images is a repeat of a pattern where the odd views of the $1^{st}$ to $N^{th}$ views are arranged sequentially and then the even views of the $N^{th}$ to $1^{st}$ views are arranged in reverse order. The second arrangement pattern, i.e. an arrangement pattern of multi-view rear ground images is a pattern obtained by shifting the first arrangement pattern by a predetermined number of views and thereby having a phase difference. The predetermined number of views are preferably 1 view, but may be modified according to a setting of the user.

With reference to FIG. 7, multi-view foreground images and multi-view rear ground images may be arranged as in Table 2 below, according to an optical view.

TABLE 2

| Optical view | 1 | 2 | 3 | 4 | 5 | 6 | 7 | 8 | 9 | 1 | 2 | 3 |
|---|---|---|---|---|---|---|---|---|---|---|---|---|
| Foreground image view | 1 | 3 | 5 | 7 | 9 | 8 | 6 | 4 | 2 | 1 | 3 | 5 |
| Rear ground image view | 2 | 1 | 3 | 5 | 7 | 9 | 8 | 6 | 4 | 2 | 1 | 3 |

As illustrated in FIG. 7, at the $5^{th}$ and $6^{th}$ optical views, the foreground image views are pseudo stereo, and the rear ground image views are stereo. The foreground image views switch from stereo to pseudo stereo at the $5^{th}$ and $6^{th}$ optical views, and the rear ground image views switch from stereo to pseudo stereo at the $6^{th}$ and $7^{th}$ optical views. Since the foreground image views switch from stereo to pseudo stereo first and then the rear ground image views switch from stereo to pseudo stereo, the impact generated by switching from stereo to pseudo stereo may be relieved. In addition, the pseudo stereo section is less than in a multi-view image in which a foreground and a rear ground are not separated so that a pseudo stereo section which makes the image viewed by the viewer awkward, may be reduced.

FIG. 8 illustrates an operation of the 3D display apparatus 100 which optically separates and displays multi-view images rendered according to the second exemplary embodiment. In FIG. 8, views of the foreground images and rear ground images arranged according to the second exemplary embodiment are illustrated corresponding to each optical view. For example, if the viewer is positioned at the $5^{th}$ and $6^{th}$ optical views, the left eye of the viewer may watch the $9^{th}$ view foreground image and the $7^{th}$ view rear ground image, and the right eye may watch the $8^{th}$ view foreground image and the $9^{th}$ view rear ground image.

Figure 9:
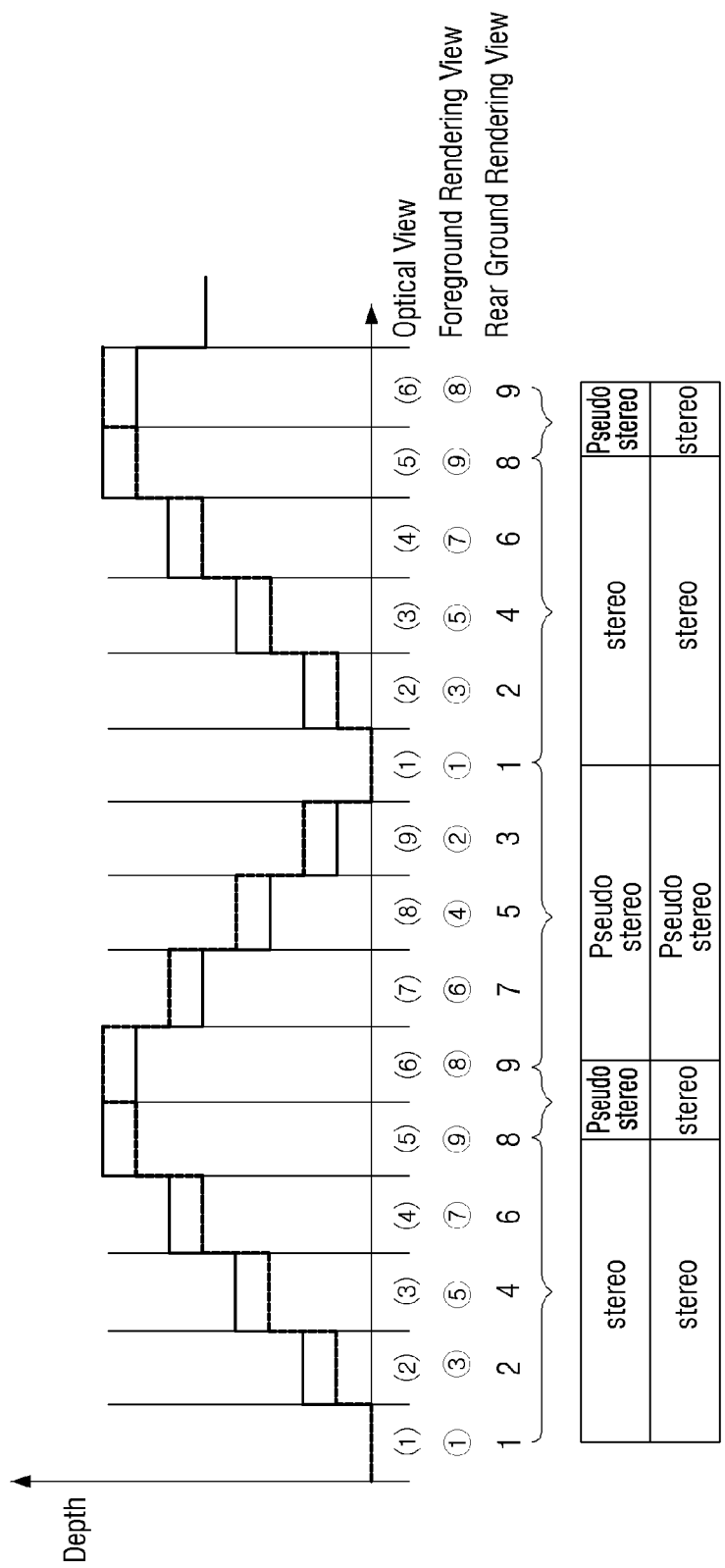
FIGS. 9 and 10 illustrate an arrangement pattern of multi-view images according to the third exemplary embodiment.
Figure 10:
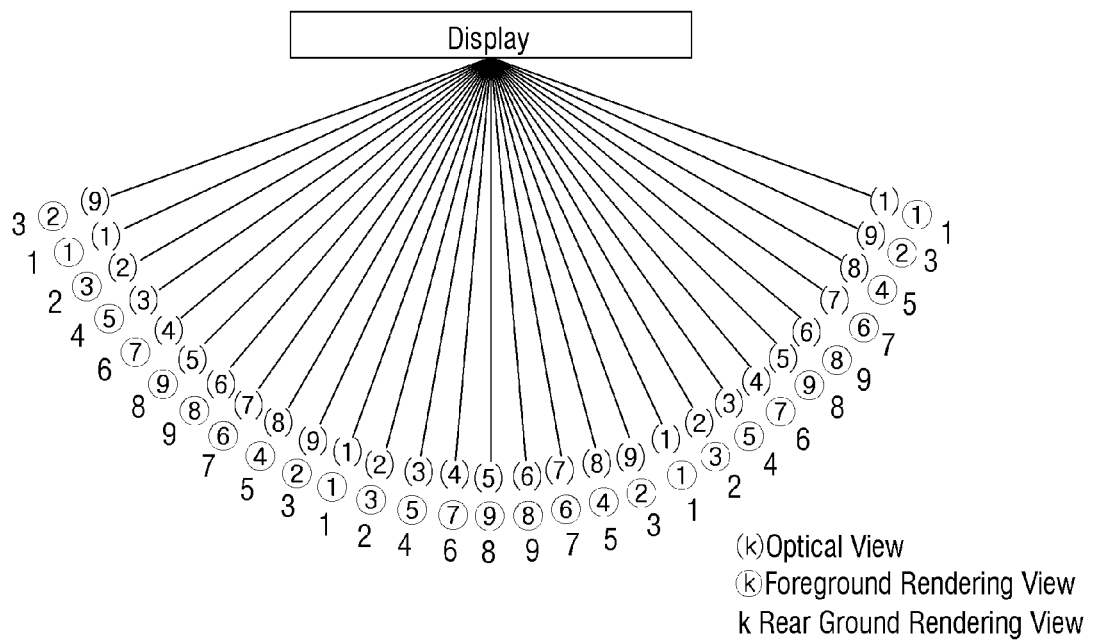

FIGS. 9 and 10 illustrate an arrangement pattern of multi-view images according to the third exemplary embodiment.

The first arrangement pattern according to the third exemplary embodiment, i.e. an arrangement pattern of multi-view foreground images is a repeat of a pattern where the odd views of the $1^{st}$ to $N^{th}$ views are arranged sequentially and then the even views of the $N^{th}$ to $1^{st}$ views are arranged in reverse order. If N is an odd number, the second arrangement pattern, i.e. an arrangement pattern of multi-view rear ground images is a repeat of a pattern where the $1^{st}$ view is arranged first, the even views of the $2^{nd}$ to $N^{th}$ views are arranged sequentially, and then the odd views of the $N^{th}$ to $2^{nd}$ views are arranged in reverse order. If N is an even number, the second arrangement pattern is a repeat of a pattern where the even views of the $1^{st}$ to $N^{th}$ views are arranged sequentially and then the odd views of the $N^{th}$ to $1^{st}$ views are arranged in reverse order.

With reference to FIG. 9, multi-view foreground images and multi-view rear ground images may be arranged as in Table 3 below, according to an optical view.

TABLE 3

| Optical view | 1 | 2 | 3 | 4 | 5 | 6 | 7 | 8 | 9 | 1 | 2 | 3 |
|---|---|---|---|---|---|---|---|---|---|---|---|---|
| Foreground image view | 1 | 3 | 5 | 7 | 9 | 8 | 6 | 4 | 2 | 1 | 3 | 5 |
| Rear ground image view | 1 | 2 | 4 | 6 | 8 | 9 | 7 | 5 | 3 | 1 | 2 | 4 |

As illustrated in FIG. 9, at the $5^{th}$ and $6^{th}$ optical views, the foreground image views are pseudo stereo, and the rear ground image views are stereo. The foreground image views switch from stereo to pseudo stereo at the $5^{th}$ and $6^{th}$ optical views, and the rear ground image views switch from stereo to pseudo stereo at the $6^{th}$ and $7^{th}$ optical views. Since the foreground image views switch from stereo to pseudo stereo first and then the rear ground image views switch from stereo to pseudo stereo, the impact generated by switching from stereo to pseudo stereo may be relieved. In addition, the pseudo stereo section is less than in a multi-view image in which a foreground and a rear ground are not separated so that a pseudo stereo section which makes the viewer awkward may be reduced.

FIG. 10 illustrates an operation of the 3D display apparatus 100 which optically separates and displays multi-view images rendered according to the third exemplary embodiment. In FIG. 10, views of the foreground images and rear ground images arranged according to the third exemplary embodiment are illustrated corresponding to each optical view. For example, if the viewer is positioned at the $5^{th}$ and $6^{th}$ optical views, the left eye of the viewer may watch the $9^{th}$ view foreground image and the $8^{th}$ view rear ground image, and the right eye may watch the $8^{th}$ view foreground image and the $9^{th}$ view rear ground image.

Figure 11:
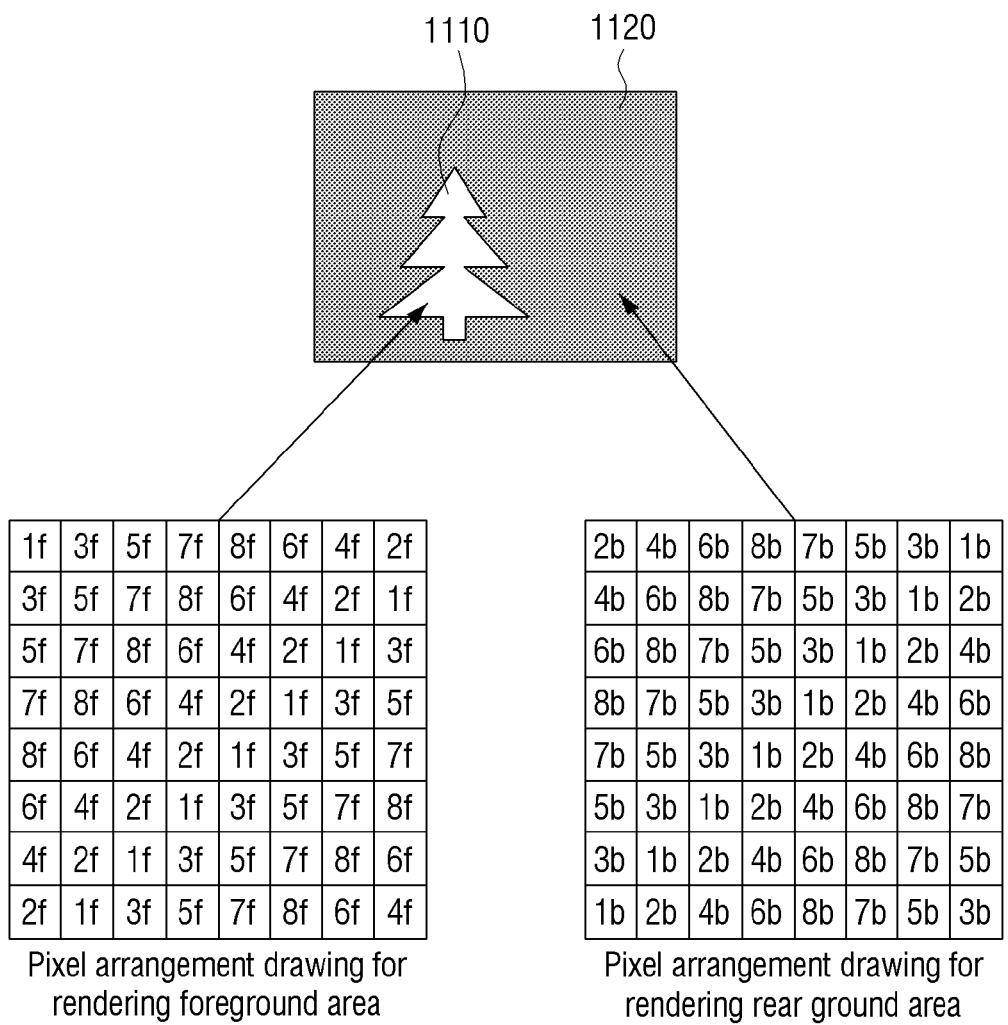
FIG. 11 illustrates operation of a multi-view image renderer according to an exemplary embodiment.

FIG. 11 illustrates operation of the multi-view image renderer 130 according to an exemplary embodiment. More specifically, a method for arranging multi-view images according to a preset arrangement pattern and rendering the multi-view images as a single frame to be displayed is described here. In this exemplary embodiment, a multi-view foreground image and a multi-view rear ground image each have 8 views.

With reference to FIG. 11, from among a foreground area 1110 and a rear ground area 1120 of an image separated by the multi-view image generator 120, in the foreground area 1110, a multi-view foreground image is rendered using only pixels arranged according to a preset arrangement pattern, and in the rear ground area 1120, a multi-view rear ground image is rendered using only pixels arranged according to a preset arrangement pattern.

In FIG. 11, the pixel arrangement drawing for each area adopts an arrangement pattern according to the third exemplary embodiment, the figure written in each pixel indicates the number of each view, "f" indicates a foreground, and "b" indicates a rear ground.

As described above, the multi-view image renderer 130 renders a multi-view foreground image and a multi-view rear ground image which are arranged according to a preset arrangement pattern using a single frame, and provides the display 140 with the rendered multi-view image.

Figure 12:
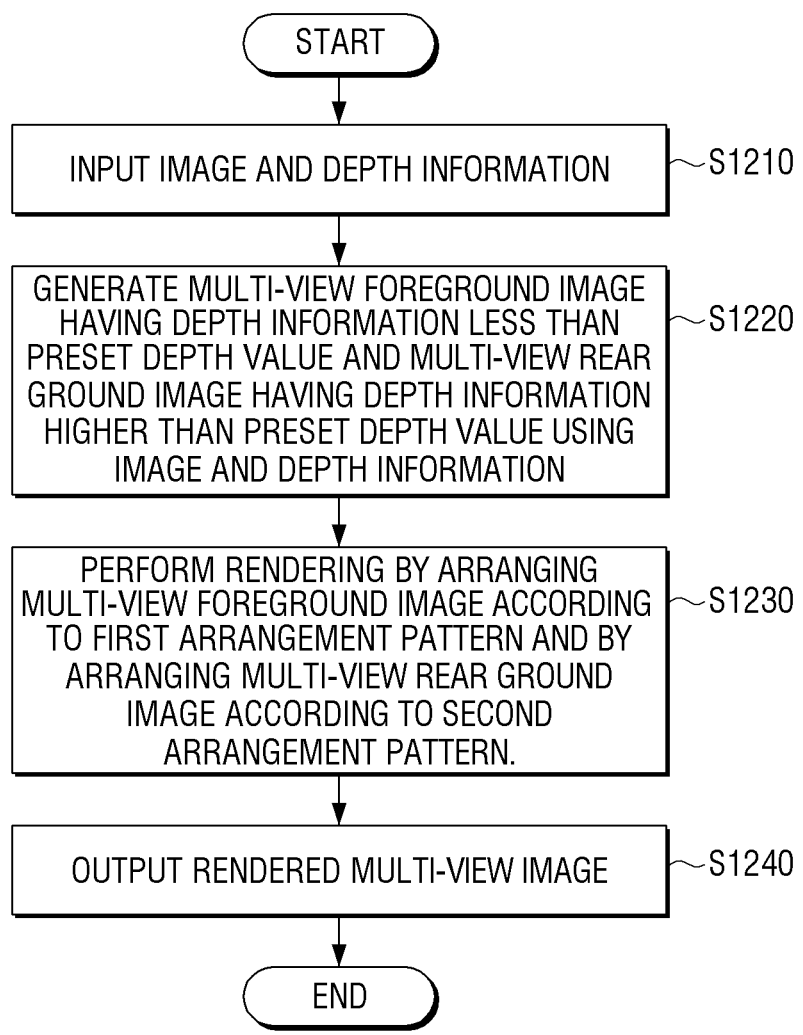
FIG. 12 is a flow chart illustrating a method for processing an image using a 3D display apparatus according to an exemplary embodiment.

FIG. 12 is a flow chart illustrating a method for processing an image using the 3D display apparatus 100 according to an exemplary embodiment.

With reference to FIG. 12, in operation S1210, the 3D display apparatus 100 receives an image and depth information of the image.

In operation S1220, the 3D display apparatus 100 generates a multi-view foreground image having depth information less than a preset depth value, and a multi-view rear ground image having depth information higher than the preset depth value based on the received image and the received depth information of the image.

A method for generating the multi-view foreground image and the multi-view rear ground image has been described with reference to FIG. 1, so detailed description is not repeated.

In operation S1230, the 3D display apparatus 100 performs rendering by arranging the multi-view foreground image according to the first arrangement pattern and by arranging the multi-view rear ground image according to the second arrangement pattern.

The multi-view foreground image and the multi-view rear ground image each may have "N" views.

In the first exemplary embodiment, if "N" is an odd number (2K−1, K is a natural number), the first arrangement pattern may be a repeat of a pattern where the $1^{st}$ view to $K^{th}$ view are arranged sequentially and then the K−$1^{th}$ view to 1st view are arranged in reverse order. If "N" is an even number (2K, K is a natural number), the first arrangement pattern may be a repeat of a pattern where the $1^{st}$ view to K+$1^{th}$ view are arranged sequentially and then the $K^{th}$ view to $2^{nd}$ view are arranged in reverse order. The second arrangement pattern may be a pattern obtained by shifting the first arrangement pattern by a predetermined number of views and thereby having a phase difference.

In the second exemplary embodiment, the first arrangement pattern may be a repeat of a pattern where the odd views of the $1^{st}$ to $N^{th}$ views are arranged sequentially and then the even views of the $N^{th}$ to $1^{st}$ views are arranged in reverse order. The second arrangement pattern may be a pattern obtained by shifting the first arrangement pattern by a predetermined number of views and thereby having a phase difference.

In the third exemplary embodiment, the first arrangement pattern may be a repeat of a pattern where the odd views of the $1^{st}$ to $N^{th}$ views are arranged sequentially and then the even views of the $N^{th}$ to $1^{st}$ views are arranged in reverse order. If N is an odd number, the second arrangement pattern may be a repeat of a pattern where the $1^{st}$ view is arranged first, the even views of the $2^{nd}$ to $N^{th}$ views are arranged sequentially and then the odd views of the $N^{th}$ to $2^{nd}$ views are arranged in reverse order. Or, if N is an even number, the second arrangement pattern may be a repeat of a pattern where the even views of the $1^{st}$ to $N^{th}$ views are arranged sequentially and then the odd views of the $N^{th}$ to $1^{st}$ views are arranged in reverse order.

In operation S1240, after rendering is completed, the 3D display apparatus 100 outputs the rendered multi-view image.

The image processing method of the 3D display apparatus 100 described in FIG. 12 may be performed by the 3D display apparatus 100 having a configuration of FIG. 3, and may also be performed by any other 3D display apparatuses having a different configuration.

In view of the above, the 3D display apparatus 100 according to the exemplary embodiment processes an image using an image processing method to reduce dead zones, thereby allowing the viewer to watch a 3D image comfortably at any position.

Furthermore, the 3D display apparatus 100 according to the exemplary embodiment processes an image using a pattern where a multi-view foreground image and a multi-view rear ground image are arranged with a predetermined phase difference so that the impact generated by switching between a stereo section and a pseudo stereo section may be relieved. In addition, a pseudo stereo section which makes the viewing of the image by the viewer uncomfortable, may be reduced.

These image processing methods according to the diverse exemplary embodiments are programmed and stored in diverse types of storage media, and thus may be implemented by diverse types of electronic devices executing the storage media.

In addition, the image processing method as described above may be implemented in a program including an algorithm which can be executed by a computer. The program may be stored and provided in a non-transitory computer readable medium.

A non-transitory computer readable medium is a medium which does not store data temporarily such as a register, cash, and memory but stores data semi-permanently and is readable by a device. More specifically, the aforementioned diverse applications or programs may be stored and provided in a non-transitory computer readable medium such as a compact disk (CD), digital video disk (DVD), hard disk, Blu-ray disk, universal serial bus (USB), memory card, and read-only memory (ROM).

The foregoing exemplary embodiments are merely exemplary and are not to be construed as limiting the inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A three-dimensional (3D) display apparatus comprising:
an image input device which receives an image and depth information of the image;
a multi-view image generator which generates a multi-view foreground image which has depth information which is less than a preset depth value, and a multi-view rear ground image which has depth information which is equal to or greater than the preset depth value, based on the received image and the received depth information of the image;
a multi-view image renderer which performs rendering by arranging the multi-view foreground image according to a first arrangement pattern and arranging the multi-view rear ground image according to a second arrangement pattern different from the first arrangement pattern; and
a display which outputs the rendered multi-view image,
wherein the received image is one of a single-view image, a stereoscopic image, and a multi-view image.

2. The 3D display apparatus as claimed in claim 1, wherein the multi-view foreground image and the multi-view rear ground image each have "N" views, wherein
when "N" is an odd number (2K−1, K is a natural number), the first arrangement pattern is a repeat of a pattern where a $1^{st}$ view to a $K^{th}$ view are arranged sequentially and then a K−$1^{th}$ view to the $1^{st}$ view are arranged in reverse order,
when "N" is an even number (2K, K is a natural number), the first arrangement pattern is a repeat of a pattern where the $1^{st}$ view to a K+$1^{th}$ view are arranged sequentially and then the $K^{th}$ view to a $2^{nd}$ view are arranged in reverse order, and
the second arrangement pattern is a pattern obtained by shifting the first arrangement pattern by a predetermined number of views to have a phase difference.

3. The 3D display apparatus as claimed in claim 2, wherein the multi-view foreground image and the multi-view rear ground image each have 9 views,
the first arrangement pattern is a pattern where $1^{st}$, $2^{nd}$, $3^{rd}$, $4^{th}$, $5^{th}$, $4^{th}$, $3^{rd}$, $2^{nd}$, and $1^{st}$ view foreground images are arranged repeatedly, and
the second arrangement pattern is a pattern where $2^{nd}$, $3^{rd}$, $4^{th}$, $5^{th}$, $4^{th}$, $3^{rd}$, $2^{nd}$, $1^{st}$ and $2^{nd}$ view rear ground images are arranged repeatedly.

4. The 3D display apparatus as claimed in claim 1, wherein the multi-view foreground image and the multi-view rear ground image each have "N" views,
the first arrangement pattern is a repeat of a pattern where odd views of a $1^{st}$ to $N^{th}$ views are arranged sequentially and then even views of the $N^{th}$ to the $1^{st}$ views are arranged in reverse order, and
the second arrangement pattern is a pattern obtained by shifting the first arrangement pattern by a predetermined number of views to have a phase difference.

5. The 3D display apparatus as claimed in claim 4, wherein the multi-view foreground image and the multi-view rear ground image each have 9 views,
the first arrangement pattern is a pattern where $1^{st}$, $3^{rd}$, $5^{th}$, $7^{th}$, $9^{th}$, $8^{th}$, $6^{th}$, $4^{th}$, and $2^{nd}$ view foreground images are arranged repeatedly, and
the second arrangement pattern is a pattern where $3^{rd}$, $5^{th}$, $7^{th}$, $9^{th}$, $8^{th}$, $6^{th}$, $4^{th}$ $2^{nd}$, and $1^{st}$ view foreground images are arranged repeatedly.

6. The 3D display apparatus as claimed in claim 1, wherein the multi-view foreground image and the multi-view rear ground image each have "N" views,
the first arrangement pattern is a repeat of a pattern where odd views of a $1^{st}$ to $N^{th}$ views are arranged sequentially and then even views of the $N^{th}$ to the $1^{st}$ views are arranged in reverse order, and
when N is an odd number, the second arrangement pattern is a repeat of a pattern where the $1^{st}$ view is arranged first, even views of $2^{nd}$ to the $N^{th}$ views are arranged sequentially and then odd views of the $N^{th}$ to the $2^{nd}$ views are arranged in reverse order, or
when N is an even number, the second arrangement pattern is a repeat of a pattern where even views of the $1^{st}$ to the $N^{th}$ views are arranged sequentially and then odd views of $N^{th}$ to $1^{st}$ views are arranged in reverse order.

7. The 3D display apparatus as claimed in claim 6, wherein the multi-view foreground image and the multi-view rear ground image each have 9 views,
the first arrangement pattern is a pattern where $1^{st}$, $3^{rd}$, $5^{th}$, $7^{th}$, $9^{th}$, $8^{th}$, $6^{th}$, $4^{th}$, and $2^{nd}$ view foreground images are arranged repeatedly, and
the second arrangement pattern is a pattern where $1^{st}$, $2^{nd}$, $4^{th}$, $6^{th}$, $8^{th}$, $9^{th}$, $7^{th}$, $5^{th}$, and $3^{rd}$ view rear ground images are arranged repeatedly.

8. An image processing method of a three-dimensional (3D) display apparatus, the method comprising:
receiving an image and depth information of the image;
generating a multi-view foreground image having depth information which is less than a preset depth value, and a multi-view rear ground image having depth information which is equal to or greater than the preset depth value, using the received image and the received depth information of the image;
performing rendering by arranging the multi-view foreground image according to a first arrangement pattern and arranging the multi-view rear ground image according to a second arrangement pattern different from the first arrangement pattern; and
outputting the rendered multi-view image,
wherein the received image is one of a single-view image, a stereoscopic image, and a multi-view image.

9. The image processing method as claimed in claim 8, wherein the multi-view foreground image and the multi-view rear ground image each have "N" views,
when "N" is an odd number (2K−1, K is a natural number), the first arrangement pattern is a repeat of a pattern where a $1^{st}$ view to a $K^{th}$ view are arranged sequentially and then a K−$1^{th}$ view to the $1^{st}$ view are arranged in reverse order,
when "N" is an even number (2K, K is a natural number), the first arrangement pattern is a repeat of a pattern where the $1^{st}$ view to a $K+1^{th}$ view are arranged sequentially and then the $K^{th}$ view to a $2^{nd}$ view are arranged in reverse order, and
the second arrangement pattern is a pattern obtained by shifting the first arrangement pattern by a predetermined number of views to have a phase difference.

10. The image processing method as claimed in claim 8, wherein the multi-view foreground image and the multi-view rear ground image each have "N" views,
the first arrangement pattern is a repeat of a pattern where odd views of a $1^{st}$ to $N^{th}$ views are arranged sequentially and then even views of the $N^{th}$ to the $1^{st}$ views are arranged in reverse order, and
the second arrangement pattern is a pattern obtained by shifting the first arrangement pattern by a predetermined number of views to have a phase difference.

11. The image processing method as claimed in claim 8, wherein the multi-view foreground image and the multi-view rear ground image each have "N" views,
the first arrangement pattern is a repeat of a pattern where odd views of a $1^{st}$ to $N^{th}$ views are arranged sequentially and then even views of the $N^{th}$ to the $1^{st}$ views are arranged in reverse order, and
when N is an odd number, the second arrangement pattern is a repeat of a pattern where the $1^{st}$ view is arranged first, even views of a $2^{nd}$ to the $N^{th}$ views are arranged sequentially and then odd views of the $N^{th}$ to the $2^{nd}$ views are arranged in reverse order, or
when N is an even number, the second arrangement pattern is a repeat of a pattern where even views of the $1^{st}$ to the $N^{th}$ views are arranged sequentially and then odd views of the $N^{th}$ to the $1^{st}$ views are arranged in reverse order.

12. A non-transitory computer readable medium which includes a program to execute an image processing method of a three-dimensional (3D) display apparatus, wherein the image processing method comprises:
receiving an image and depth information of the image;
generating a multi-view foreground image having depth information which is less than a preset depth value, and a multi-view rear ground image having depth information which is equal to or greater than the preset depth value, using the received image and the received depth information of the image;
performing rendering by arranging the multi-view foreground image according to a first arrangement pattern and arranging the multi-view rear ground image according to a second arrangement pattern different from the first arrangement pattern; and
outputting the rendered multi-view image,
wherein the received image is one of a single-view image, a stereoscopic image, and a multi-view image.

13. A three-dimensional (3D) display apparatus comprising:
an image input device, which receives an image and depth information of the image;
a multi-view image generator, which generates a multi-view foreground image and a multi view rear ground image based on the received image,
a multi-view image renderer, which renders the image by arranging the multi-view foreground image based on a first arrangement pattern, and arranging the multi-view rear ground image by a second arrangement pattern different from the first arrangement pattern, and
a display which outputs the rendered multi-view image,
wherein the received image is one of a single-view image, a stereoscopic image, and a multi-view image.

14. The 3D apparatus of claim 13, wherein the multi-view foreground image has a depth which is less than a preset depth value, and the multi view rear ground image has a depth which is equal to or greater than the preset depth value.

* * * * *